United States Patent
Shim et al.

(10) Patent No.: US 7,048,673 B2
(45) Date of Patent: May 23, 2006

(54) SHIFT CONTROL METHOD FOR SIX-SPEED AUTOMATIC TRANSMISSION

(75) Inventors: Hyu-Tae Shim, Gyeonggi-do (KR); Hyuk-Bin Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 73 days.

(21) Appl. No.: 10/729,495

(22) Filed: Dec. 5, 2003

(65) Prior Publication Data

US 2004/0116251 A1    Jun. 17, 2004

(30) Foreign Application Priority Data

Dec. 5, 2002    (KR)    ...................... 10-2002-0076921

(51) Int. Cl.
*F16H 61/04*    (2006.01)
(52) U.S. Cl. ...................... 477/143; 477/148
(58) Field of Classification Search ............ 477/143–4, 477/148, 154, 905
See application file for complete search history.

(56) References Cited

U.S. PATENT DOCUMENTS

| | | | | |
|---|---|---|---|---|
| 4,916,979 A | * | 4/1990 | Irwin | 477/148 |
| 5,624,351 A | * | 4/1997 | Fujita et al. | 477/148 |
| 5,662,551 A | | 9/1997 | Kamada | |
| 5,863,276 A | * | 1/1999 | Lee | 477/144 |
| 6,024,672 A | * | 2/2000 | Chung | 477/144 |
| 6,066,071 A | | 5/2000 | Janecke et al. | |
| 6,146,310 A | * | 11/2000 | Janecke | 477/148 |
| 6,270,444 B1 | | 8/2001 | Tsutsui et al. | |
| 6,375,592 B1 | | 4/2002 | Takahashi et al. | |
| 2002/0086760 A1 | | 7/2002 | Hayabuchi et al. | |
| 2002/0086761 A1 | | 7/2002 | Hayabuchi et al. | |
| 2002/0151409 A1 | | 10/2002 | Hayabuchi et al. | |
| 2003/0228954 A1 | * | 12/2003 | Runde et al. | 477/107 |

FOREIGN PATENT DOCUMENTS

JP    408261316 A    * 10/1996

* cited by examiner

*Primary Examiner*—Roger Pang
(74) *Attorney, Agent, or Firm*—Morgan Lewis & Bockius LLP

(57) ABSTRACT

A shift control method for a gearset with greater than or equal to 5 speeds, allowing to perform a sequential shift and a multi-skip shift in relation to the multi-shift stages, contributing to an improved response during shifting. The shift control method comprises steps of performing a preceding shift control when disengagement components of a preceding shift stage and a final target shift stage are identical during skip shifting, then executing a one-stage skip control toward the final target shift stage if a certain set of required conditions are satisfied; and standing by for a predetermined time period without performing the preceding shift control when the disengagement components of the preceding shift stage and the final target shift stage are different during skip shifting, then performing a one-stage skip control toward the final target shift stage only if pertinent conditions are met.

2 Claims, 7 Drawing Sheets

FIG.2

|  | UD/C | OD/C | REV/C | L&R/B | 2ND/B | F1 | DIR/C | RED/B | F2 |
|---|---|---|---|---|---|---|---|---|---|
| FIRST SPEED | O |  |  | O |  | O |  |  | O |
| SECOND SPEED | O |  |  |  | O |  |  | O | O |
| THIRD SPEED | O | O |  |  |  |  |  | O | O |
| FOURTH SPEED | O | O |  |  | O |  |  | O | O |
| FIFTH SPEED |  | O |  |  |  |  | O |  |  |
| SIXTH SPEED |  | O |  |  | O |  | O |  |  |
| R |  |  | O | O |  |  |  | O |  |

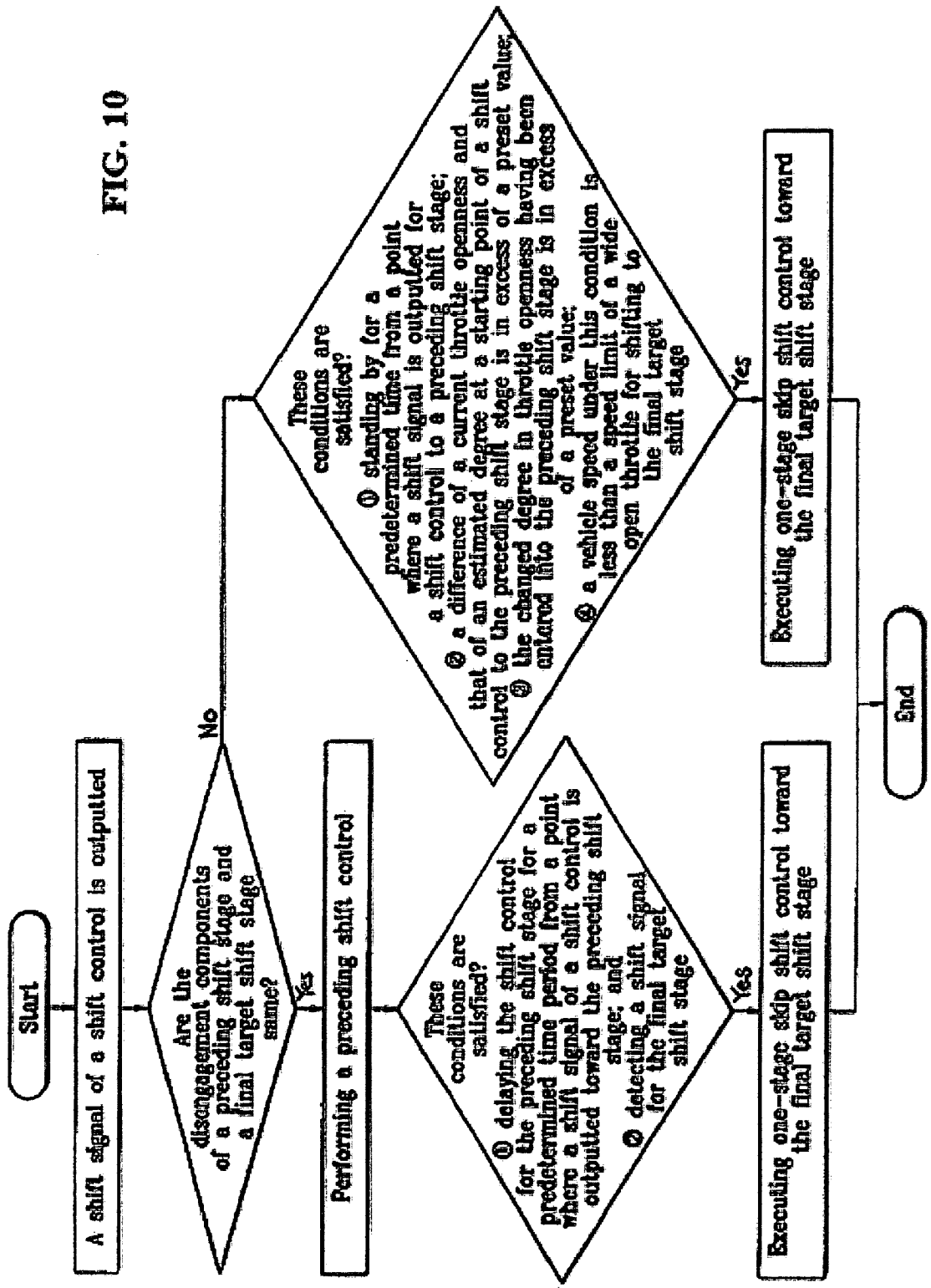

SHIFT CONTROL METHOD FOR SIX-SPEED AUTOMATIC TRANSMISSION

CROSS-REFERENCE TO RELATED APPLICATIONS

This application claims priority of Korean Application No. 10-2002-0076921, filed on Dec. 5, 2002, the disclosures of which are incorporated fully herein by reference.

FIELD OF THE INVENTION

The present invention relates to a shift control method for a six-speed automatic transmission. In particular, the present invention relates to a shift control method whereby a skip shift of one or more stages can be selectively performed by advancing into a preceding shift stage and to a final target shift stage when disengagement components of the preceding and the final target shift stages are either identical to or different from each other.

BACKGROUND OF THE INVENTION

A conventional automatic transmission includes a planetary gearset, which forms a multi-gear train, and a friction component for changing a gear ratio and torque transmission route in response to the planetary gearset engaging and disengaging with an input shaft and housing of the transmission. Conventional planetary gearsets output a multi-gear ratio in an automatic transmission with more than 5 speeds, thus increasing the driving force at low speeds and improving fuel consumption rate at high speeds.

Also, in order for the planetary gearset to output a multi-gear ratio in an automatic transmission with 5 speeds or greater, a skip shift of more than one stage is necessary. The skip shift, which can change the shift stage for one or more stages during shifting, improves the response during shifting.

However, a 5-3 or 4-2 skip shift in a conventional 5-speed automatic transmission is not a skip shift in the real sense because the 5-3 and 4-2 skip shift are sequentially performed in a 5-4-3 and 4-3-2 pattern, respectively.

In a 5-speed automatic transmission, the 5-3 or 4-2 skip shift is sequentially performed as a result of a hardware feature of the transmission, and more particularly, as a result of a difficulty of simultaneously controlling two engagement components and two disengagement components during the skip shifting.

As a result, there is a drawback in a conventional 5-speed automatic transmission in that the sequential shift rendered during the skip shift lowers the response in comparison with the true meaning of the skip shift.

SUMMARY OF THE PRESENT INVENTION

Embodiments of the present invention provide a shift control method adapted to perform sequential shifting and multi-skip shifting in relation to multi-shift stages in an automatic transmission of not less than 5 speeds, thus improving the response of the shifting.

In a preferred embodiment of the present invention, there is provided a shift control method for a six-speed automatic transmission which comprises the steps of performing a preceding shift control when disengagement components of a preceding shift stage and a final target shift stage are identical during skip shifting, then executing a one-stage skip control toward the final target shift stage if a predetermined set of required conditions are satisfied. Next, the one-stage skip control is in a standby mode for a predetermined time without performing the preceding shift control when the disengagement components of the preceding shift stage and the final target shift stage are different during skip shifting, then performing a one-stage skip control toward the final target shift stage only if predetermined conditions are met.

BRIEF DESCRIPTION OF THE DRAWINGS

For fuller understanding of the nature and objects of the present invention, reference should be made to the following detailed description taken in conjunction with the accompanying drawings in which:

FIG. 2 is an operational table illustrating a friction component actuated when there occurs a shift for first through sixth speed gears in a planetary gearset of FIG. 1; and FIGS. 3 to 10 are graphs and a flowchart illustrating a skip shift procedure of a six-speed automatic transmission based on changes of turbine revolutions in relation to lapse of time according to an embodiment of the present invention.

DETAILED DESCRIPTION OF THE INVENTION

The preferred embodiment of the present invention will now be described in detail with reference to the accompanying drawings.

Figure 1:
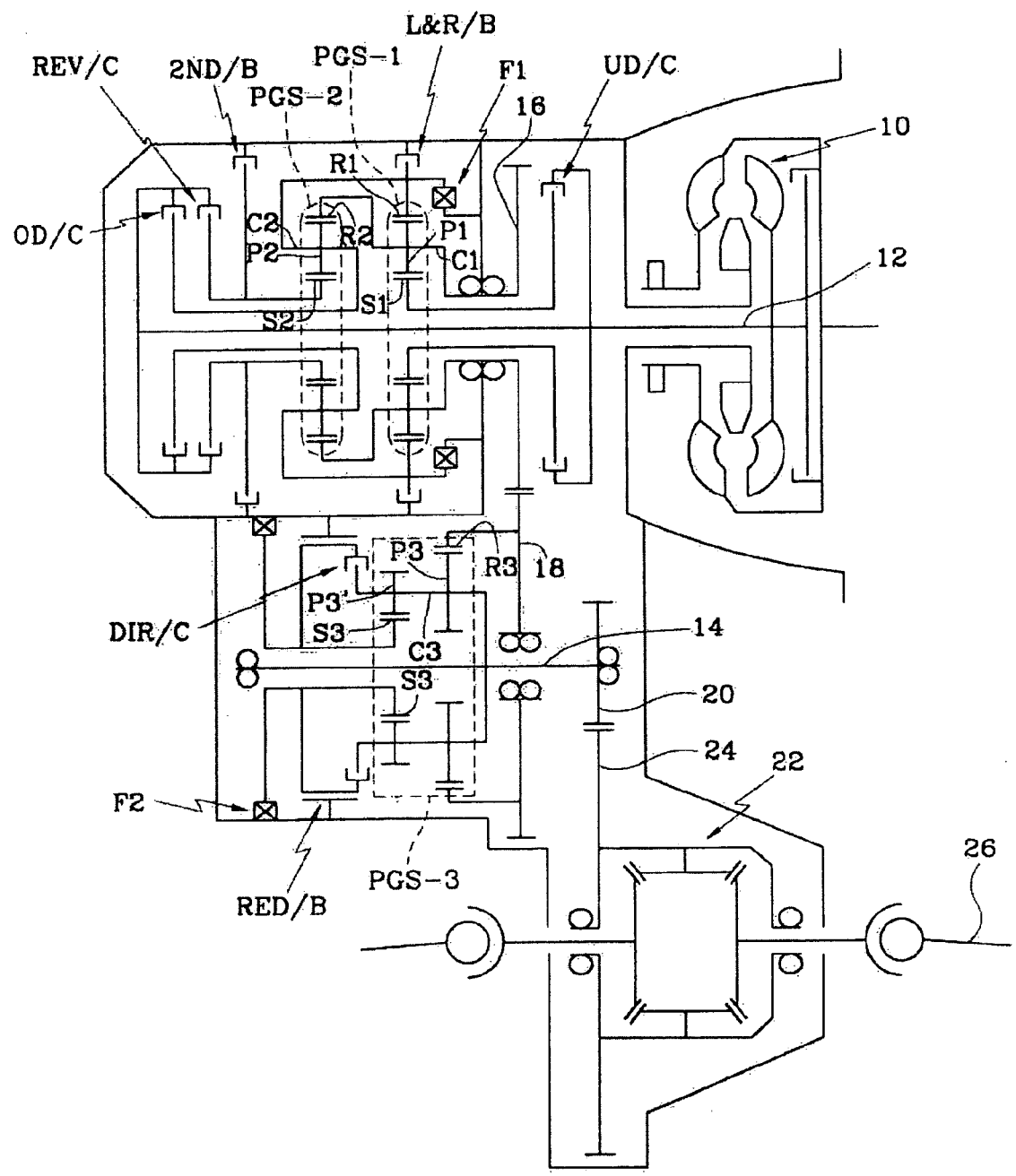
FIG. 1 is a schematic view illustrating a planetary gearset of a six-speed automatic transmission according to an embodiment of the present invention.

As shown in FIG. 1, a planetary gearset of a six-speed automatic transmission according to an embodiment of the present invention includes a main shift part including a simple planetary gear of two single pinion types, which initially changes the driving force transmitted from the engine. An auxiliary shift part includes a simple planetary gear of one single pinion type that changes the driving force shifted from the main shift part.

The main shift part comprises a first planetary gearset (PGS-1) and a second planetary gearset (PGS-2) both sequentially disposed at an input shaft (12) that is connected to a torque converter (10). The auxiliary shift part is formed with a third planetary gearset (PGS-3), which is disposed at an output shaft (14) that is detached from the input shaft (12).

Each of the first planetary gearset (PGS-1), the second planetary gearset (PGS-2), and the third planetary gearset (PGS-3) comprises one simple planetary gear of a single pinion type, wherein the simple planetary gear includes: a first through third sun gears (S1, S2, S3); a first through third pinion gears (P1, P2, P3) externally meshed with first through third sun gears (S1, S2, S3), respectively; a first through third ring gears (R1, R2, R3) internally meshed with first through third pinion gears (P1, P2, P3), respectively; and a first through third carriers (C1, C2, C3) supportably connected to the central shaft placed between the first through third pinion gears (P1, P2, P3).

In the main shift part, the first carrier (C1) of the first planetary gearset (PGS-1) is connected to the second ring gear (R2) of the second planetary gearset (PGS-2). The second carrier (C2) of the second planetary gearset (PGS-2) is connected to the first ring gear (R1) of the first planetary gearset (PGS-1). The first carrier (C1) is connected with a transfer drive gear (16), which functions as an output component of the main shift part.

An under drive clutch (UD/C) is installed between the input shaft (12) and the first sun gear (S1). A first one-way clutch (F1) and a low/reverse brake (L&R/B) are placed between the first ring gear (R1) and a housing (H).

A reverse clutch (REV/C) is installed between the input shaft (12) and the second sun gear (S2). A second brake (2ND/B) is installed between the second sun gear (S2) and the housing (H). And an over drive clutch (OD/C) is placed between the input shaft (12) and the second carrier (C2).

Hence, the input component of the main shift part is the input shaft (12) and the output component is the first carrier (C1).

Further, in the auxiliary shift part, the third ring gear (R3) of the third planetary gear set (PGS-3) is connected to a transfer driven gear (18) meshed with the transfer drive gear (16), which functions as an output component of the main shift part. The third carrier (C3) is configured with third pinion gears (P3, P3') both having different diameters. Moreover, the third ring gear (R3) meshes with the third pinion gear (P3) mounted at the third carrier (C3). The third sun gear (S3) meshes with the third pinion gear (P3') whose diameter is smaller than the third pinion gear (P3) mounted at the third carrier (C3).

A direct clutch (DIR/C) is positioned between the third sun gear (S3) and the third carrier (C3), while a reduction brake (RED/B) and a second one-way clutch (F2) are respectively installed between the third sun gear (S3) and the housing (H).

The third carrier (C3) is connected with the output shaft (14) connected to a differential drive gear (20), which functions as an output component of the auxiliary shift part. The differential drive gear (20) is meshed with a differential driven gear (24) of a differential (22). The differential driven gear (24) is connected with a driving shaft (26) via the differential (22).

As a result, the input component of the auxiliary shift part is the third ring gear (R3), and the output component of the auxiliary shift part is the third carrier (C3).

Thus, the planetary gearset of a six-speed automatic transmission according to the present invention is properly engaged or disengaged with a required friction component according to each shift stage as shown in the table of FIG. 2, thereby respectively outputting gear ratios of six forward speeds and a reverse stage.

A shift control method in accordance with the present six-speed automatic transmission will now be described in detail during a down skip shifting.

EXAMPLE I

A Shift Control Method For a One-Stage Skip Shift

Even when skip shifting is requested, a six-speed automatic transmission of the present invention is designed to perform a shift control to a preceding shift stage when disengagement components of the preceding and final target shift stages are identical. Only when a predetermined set of required conditions is satisfied is a shift control for a one-stage skip shift performed to the final target shift stage. As used herein, preceding shift stage refers to the shift stage that is adjacent the final target shift stage and lies between the current shift stage and the final target shift stage. For example in a shift skip from fifth to second gears, the preceding shift stage is third gear.

For the required conditions, the shift control for the preceding shift stage is delayed for a predetermined period of time from a point where a shift signal of a shift control is outputted toward the preceding shift stage. Also, a driver's shift intention is not detected to the preceding shift stage, but to the final target shift stage. That is, the shift signal for the final target shift stage is detected in these required conditions.

The delayed shift control for the preceding shift stage for a predetermined time period from a point where a shift signal to the preceding shift stage is outputted implies that there is no revolution change for a required gear train in a planetary gearset while the shift to the preceding shift stage is controlled. The driver's intention to shift toward the final target shift range can be detected by comparing changes of a throttle openness with a preset shift pattern according to a current vehicle speed.

In a one-stage skip shift, when the identical disengagement components of the preceding and final target shift stages are all in the auxiliary shift part, a skip shift is started and a shift to the final target shift stage is performed at the same time without controlling the disengagement components placed at the main shift part of the preceding shift stage.

While the main and auxiliary shift parts are simultaneously shifted, the shift control starts from the auxiliary shift part because there is insufficient time at the main shift part for the friction component to be either engaged or disengaged even if the shift control is performed.

The reason the shift control is started from the auxiliary shift part during shifting is that an abnormal phenomenon is generated where revolution of the turbine is not increased even during the down shift but rather decreased when shift control is started from the main shift part, which is a feature of the planetary gearset according to the present invention.

Further, when the disengagement components of the preceding and final target shift stages are different from each other in a six-speed automatic transmission of the present invention, shifting is delayed for a predetermined time period from a point where a shift signal is outputted for a shift control to the preceding shift stage. After the shifting has been delayed, it is determined whether a skip shift is generated. If a skip shift occurs, a shift control for the skip shift to the final target shift range is performed.

A condition for determining the generation of the skip shift will now be described.

First, shifting is in a stand-by state while a shift signal for performing a shift control to the preceding shift stage is outputted. Successively, a difference of the current throttle openness and that of an estimated degree at a starting point of a shift control to the preceding shift stage is in excess of a preset value. And the changed degree in throttle openness having been entered into the preceding shift stage is in excess of a preset value.

It should be noted that the vehicle speed or output shaft speed (No) at this time is less than the established speed limit of a wide open throttle (WOT) for shifting to the final target shift stage.

In other words, when the skip shift generated while shifting to the preceding shift stage is in a stand-by state for an estimated period of time, a shift control for the skip shift to the final target shift stage is executed. However, when a skip shift does not occur, a shift control for the preceding shift stage is performed.

EXAMPLE II

Shift Control Method for a Two-Stage Skip Shift

In the present six-speed automatic transmission, when the difference calculated between a turbine revolution during a synchronization to a preceding shift stage and a current turbine revolution is less than the established value during a shift control for a one-stage skip shift, and if a shift signal to a final target shift stage occurs, a one-stage skip shift is completed to the preceding shift stage and a sequential shift control to the final target shift stage is performed.

If a driver's intention is previously detected toward the final target shift stage during a shift to a preceding shift stage, a sequential shift to the final target shift stage is performed right after completion of the one-stage skip shift to the preceding shift stage, such that the response of the shift can be improved.

A friction component disposed at the main shift part is generally engaged in the preceding shift stage and is disengaged in the final target shift stage. However, in the present invention, the friction component is disengaged during the shift procedure to the preceding shift stage, thereby shortening the time period required to respond to the shift during the shift to the final target shift stage.

EXAMPLE III

Shift Control Method for Greater Than or Equal to a Two-Stage Skip Shift

In a skip shift greater than or equal to two stages, such as a three-stage skip shift, if a shift signal to the final target shift stage is generated during a one-stage skip shift for the preceding shift stage, a different value is detected between turbine revolution generated during a synchronization with the preceding shift stage and the current turbine revolution. If the different value thus calculated is less than the established one, a one-stage skip shift to a final target shift stage is performed after completion of the one-stage skip shift to the preceding shift stage.

Once the driver's shift intention is detected toward the final target shift stage during the shift to the preceding shift stage, the target stage can be changed to the final target shift stage in advance. The one-stage skip shift to the final target shift stage is implemented right after the one-stage skip shift to the preceding shift stage, resulting in an improved response in the shifting.

The skip shift control method of the present invention will now be described in detail according to the preferred embodiments.

First, a one-stage skip shift procedure will be described in a case where disengagement components of the preceding and final target shift stages are identical.

EXAMPLE IV

One-Stage Skip Shift from Third to First Speed Gear

Figure 3:
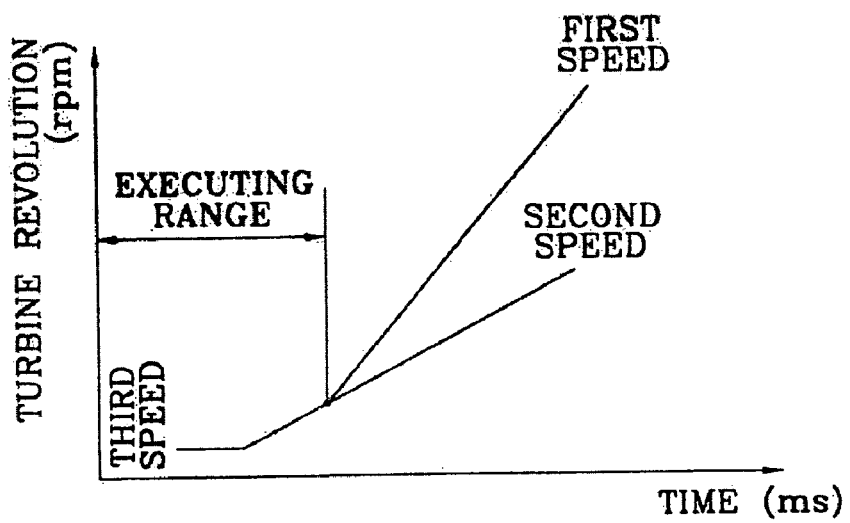

As illustrated in FIG. 3, when both disengagement components of the preceding second speed gear and the final first speed gear are identical with the over drive clutch (OD/C) of the main shift part, a shift control for a sequential shift from third to second is started. Only if all standards for determining a one-stage skip shift are fulfilled, a shift control for a one-stage skip shift from third to first speed gear is performed. The determining standard for a one-stage skip shift contains the following three conditions.

First, a shift signal for a 3-2 shift is established and a predetermined time (approximately 120 ms) is lapsed. Second, a shift for the 3-2 shift is not started. Third, a shift signal for the first speed gear is detected.

If all of the above three conditions are satisfied, a shift control for a one-stage skip shift from the third to first speed gear is performed during a sequential 3-2 shifting.

In that case, a predetermined lapse of time after a shift signal for the 3-2 shift described in the first condition implies excessive shifting to the preceding second speed gear. Therefore, the first condition is made to reduce a control difficulty and a shift impact accompanied by the difference of operational components for engaging or disengaging at the preceding and final target shift stages (the engagement component of the preceding shift stage is a second brake ($2^{ND}$/B) and the engagement component of the final target shift stage is a Low/Reverse Brake (L&R/B)) when a skip shift to the final first speed gear is executed.

In the second condition, a revolution change among the gears in the planetary gearset already occurs when a shift to the preceding second speed gear is detected to be started. The second condition is thereby made to prevent shift impact generated by a rapid revolution change among the gears in the planetary gear set while a one-stage skip shift to the final first speed gear is performed.

With regard to the third condition, a one-stage skip shift is performed only if a shift signal to the final first speed gear is detected as the driver's intention during a sequential shift to the preceding shift stage.

EXAMPLE V

One-Stage Skip Shift from Fifth to Third Speed Gear

Figure 4:
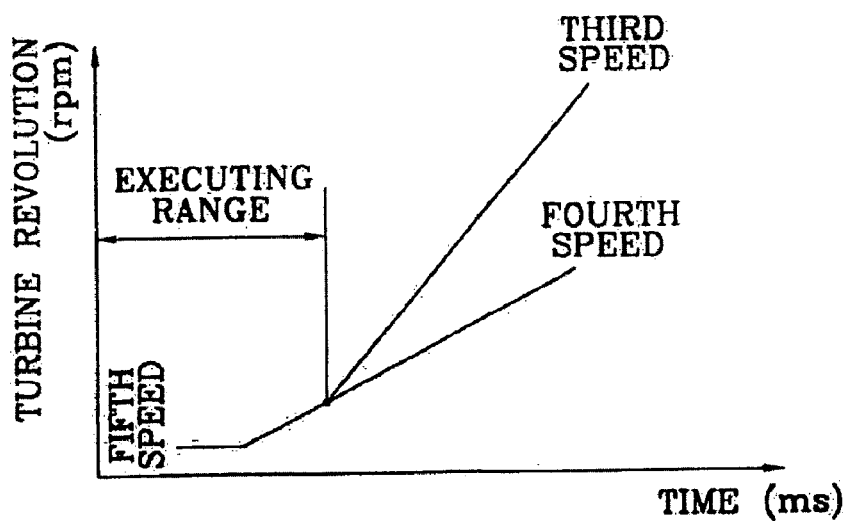

As shown in FIG. 4, each disengagement component of the preceding fourth speed gear and the final third speed gear is a direct clutch (DIR/C) of the auxiliary shift part. Thereafter, a shift control for a sequential shift from the fifth to fourth speed gear is performed. A shift control for the fifth to third speed gear is performed only if all requirements are satisfied for the one-stage skip shift.

The following three conditions should be satisfied to perform the one-stage skip shift.

First, a shift signal for 5-4 shift is established and a predetermined time (about 120 ms) is lapsed. Second, a shift for 5-4 shift is not started. Third, a shift signal for the third speed gear is detected.

If all of the above three conditions are satisfied, a shift control for a one-stage skip shift from the fifth to third speed gear is executed during a sequential shift from the fifth to fourth speed gear.

The three conditions for performing a one-stage skip shift from the fifth to fourth speed gear are identical to the one-stage skip shift from the third to first speed gear. The only difference is that, when a friction component is either engaged or disengaged at the main and the auxiliary shift parts at the same time during shifting, a shift control is always started from the auxiliary shift part. Therefore, an under drive clutch (UD/C) disengaged in the process of the preceding shift of 5-4 during the one-stage skip shift is controlled for a one-stage skip shift of 5-3 shift and simultaneously controlled again for an engagement.

The shift control starts from the auxiliary shift part when the friction components of both main and auxiliary shift parts are simultaneously engaged or disengaged. That is because if the control is started from the main shift part, the turbine revolutions decrease to an unintentional direction in spite of a down shift. That is one of the features of a hardware mechanism of a planetary gear set in the present six-speed automatic transmission.

Accordingly, with reference to FIGS. 3 and 4, when the disengagement component of respective preceding and final target shift stages is identical, the response of the shift thus described can be improved by the one-stage skip shift.

The one-stage skip shift where the preceding and final target shift stages have different disengagement components will now be described.

EXAMPLE VI

One-Stage Skip Shift from Fourth to Second Speed Gear

Figure 5:
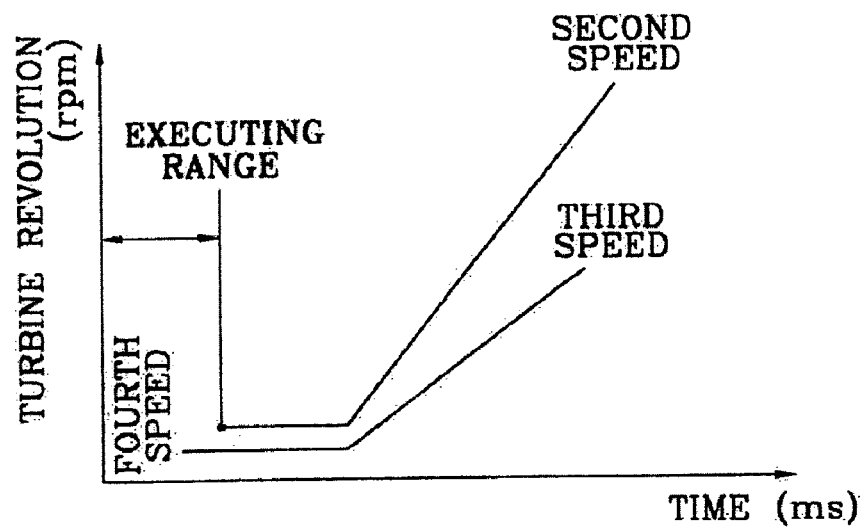

As illustrated in FIG. 5, when the disengagement components of the preceding third speed gear and the final second speed gear are respectively a second brake (2ND/B) and an over drive clutch (OD/C) of the main shift part, shifting is on a stand-by state for a predetermined time period (96 ms) from a point where a shift signal for a shift control to the preceding third speed is outputted.

When the shifting is in a stand-by state, whether a one-stage skip shift is controlled is determined by detecting a generation of a skip shift under the below conditions.

Four conditions should be examined for a shift control of the one-stage skip shift.

First, a shift should be in a stand-by state for a predetermined time period (96 ms) from the starting point of a 4-3 shifting control. Second, the differentiated degree of openness between a current throttle openness and a throttle openness in the case of a starting point of a 4-3 shifting control must exceed the preset value. Third, the change in throttle openness in relation to the required time period for the starting point of a 4-3 shifting control to the current throttle openness must exceed the preset value. Fourth, the vehicle speed or output shaft speed of the current open throttle should be less than the speed limit of a wide open throttle for shifting to the final target shift stage.

A one-stage skip shift from the fourth to second speed gear is controlled during postponement of a sequential 4-3 shifting if all four conditions are satisfied.

When each disengagement component of the preceding third speed gear and the final second speed gear is different, a skip shift for 4-2 shifting cannot be performed during a 4-3 shift control. Therefore, with regard to the first condition, it is decided whether the next shift control should be either a sequential or a skip shift by detecting the driver's intention for a preset time period.

In the second condition, it is detected how far the shifting advances toward the preceding 4-3 shifting control range via a change of the throttle openness at a preset time period.

In the third condition pursuant to the second condition, it is detected whether a following shift might be remained at the preceding shift stage or entered the region of the final target shift stage by comparing the transient point of accessing the preceding shift stage with a preset value through a throttle openness change rate.

The fourth condition is made only if all the above three conditions are satisfied in order to make the final target shift to the second speed gear, only if the current vehicle speed in relation to the throttle openness varied during a shift to the final second speed gear is less than a limiting vehicle speed at a wide open throttle as the 3-2 shift entering limit.

EXAMPLE VII

One-Stage Skip Shift from Sixth to Fourth Speed Shift

Figure 6:
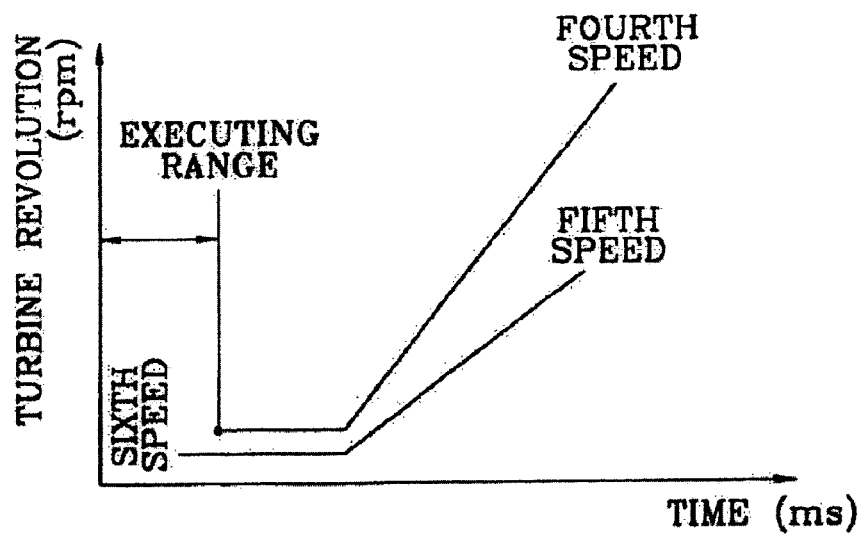

As shown in FIG. 6, the second brake (2ND/B) of the main shift part and direct clutch (DIR/C) of the auxiliary shift part are disengagement components for the preceding fifth speed gear and a final fourth speed gear, respectively. Therefore, a shift is not made for a predetermined time period (96 ms) from the time that a shift signal for a shift control is outputted to the preceding fifth speed gear.

Moreover, only when the following standards are all satisfied, a shift control for the one-stage skip shift is performed.

The four conditions for determining the one-stage skip shift are described below.

First, a shift is delayed for a predetermined time period (96 ms) from the starting point of the 6-5 shifting control. Second, the difference calculated between the current throttle openness and a throttle openness at the starting point of 6-5 shift control should exceed a preset value. Third, the change of the throttle openness in relation to the required time period from a starting point of the 6-5 shifting control to the current throttle openness should exceed a preset value. Fourth, the vehicle speed or output shaft speed (No) regarding the current throttle openness is less than the speed limit of a wide open throttle for shifting to the final target shift stage.

Under the satisfaction of all four conditions, a one-stage skip shift control from the sixth to fourth speed gear is made while a sequential 6-5 shift is in a stand-by state.

The four conditions are identical with the aforesaid one-stage skip shift from the fourth to second speed gear. A shift control for a skip shift is executed to the final target shift stage while a shift to the preceding shift stage is delayed for a set time period. A shift control to the preceding shift stage is carried out when a skip shift does not occur.

A two-stage skip shift for a consecutive one-stage skip shift and a sequential shift will now be described.

EXAMPLE VIII

Two-Stage Skip Shift from Fifth to Second Speed Gear

Figure 7:
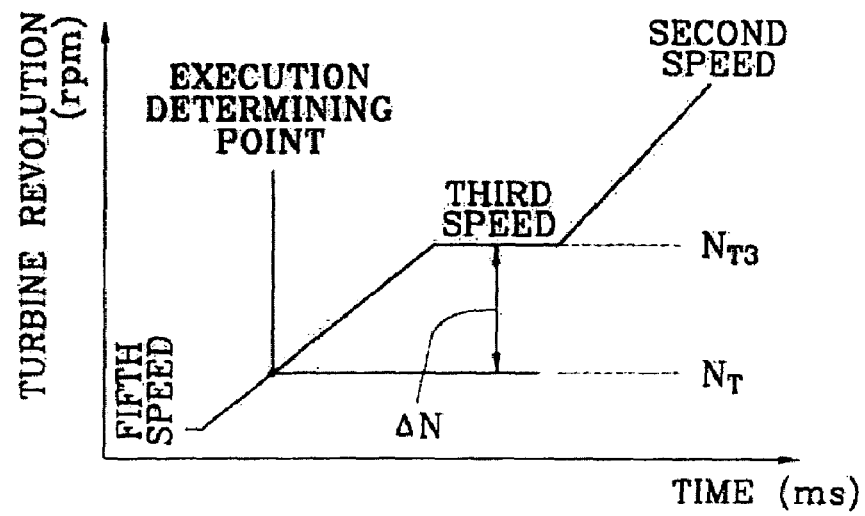

As illustrated in FIG. 7, if the difference between a turbine revolution ($N_{T3}$) at synchronization with the preceding third speed gear and a current turbine revolution ($N_T$) is less than a predetermined value ($\Delta N$) during a shift control of a one-stage skip shift as mentioned in the 5-3 speed shift, and if a shift signal to the final second shift is outputted, a one-stage skip shift to a preceding third speed gear is completed. A sequential shift to the final second speed gear is then successively controlled.

At this time, an over drive clutch (OD/C) of the main shift part engaged during the one-stage skip shift induces a two-stage skip shift from the fifth to second speed gear, and simultaneously maintains disengagement for converting the final second speed gear into a disengaging state.

Thus, if the final target shift stage is changed during the shift to the preceding shift stage, the final target shift stage can be corrected by a previous detection. A shift to the corrected final target shift stage is sequentially made right after the shift to the preceding shift stage, thereby the response of the shift is improved.

In this case, the over drive clutch (OD/C) disposed at the main shift part is engaged in the preceding third speed gear but disengaged in the final second shift gear. The over drive clutch (OD/C) is disengaged during a shift to the preceding shift stage, shortening the time period required during the two-stage skip shift.

EXAMPLE IX

Two-Stage Skip Shift from Sixth to Third Speed Gear

Figure 8:
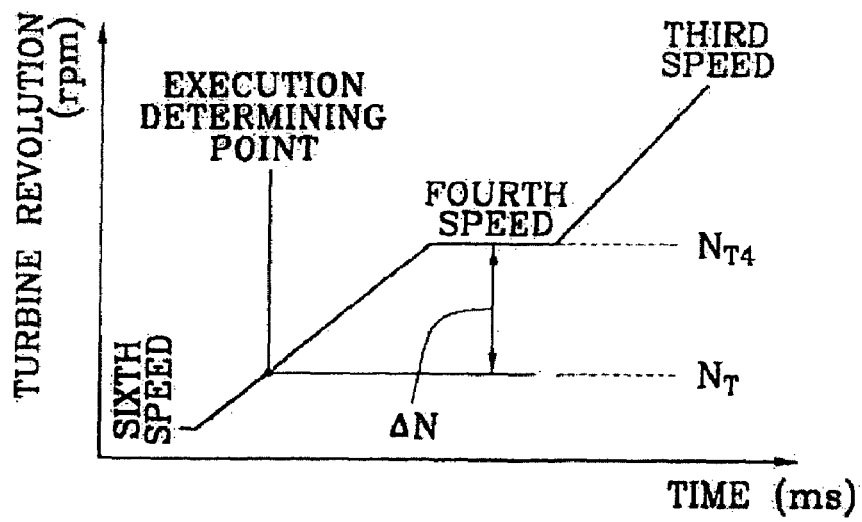

As illustrated in FIG. 8, when the difference of a turbine revolution at synchronization with the preceding fourth speed gear ($N_{T4}$) and the current turbine revolution ($N_T$) is less than a preset value ($\Delta N$), and if a shift signal to the final third speed gear is presented during a one-stage skip shift as mentioned in the above 6-4 shifting, a one-stage skip shift to the preceding fourth speed gear is completed. A sequential shift to the final third speed gear is then controlled.

At this time, a second brake (2ND/B) of the main shift part engaged during the one-stage skip shift starts the two-stage skip shift from the sixth to the third speed gear, and maintains disengagement for converting the final third speed gear into a disengaged state.

Hence, the final target shift stage can be preliminarily corrected by detecting the change of the final target shift stage during the shift to the preceding shift stage. A sequential shift to the corrected final target shift stage is made right after the completion of shifting to the preceding shift stage, thereby improving the response in the shifting.

A three-stage skip shift for a consecutive one-stage skip shift will now be briefly described.

EXAMPLE X

Three-Stage Skip Shift from Sixth to Second Speed Gear

Figure 9:
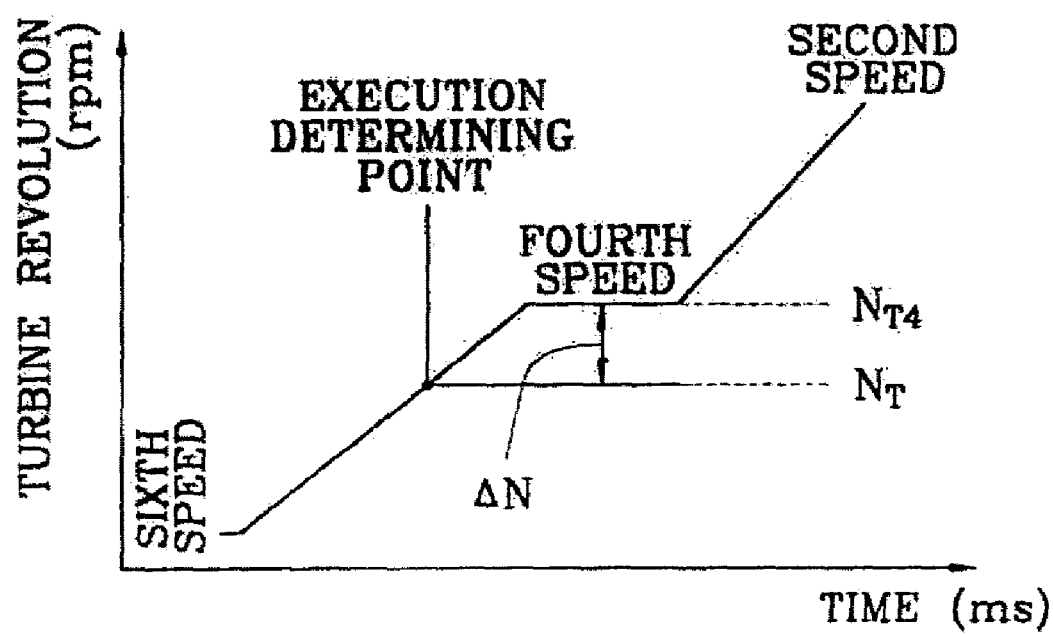

As illustrated in FIG. 9, once the difference of the turbine revolution ($N_{T4}$) at synchronization with the preceding fourth speed gear and a current turbine revolution ($N_T$) is less than a preset value ($\Delta N$) during the one-stage skip shift as mentioned in the above 6-4 shifting, and if a shift signal to the final second shift gear is outputted, a skip shift to the final second shift stage is controlled right after the one-stage skip shift to the preceding fourth speed gear is completed.

A direct clutch (DIR/C) of the auxiliary shift part is disengaged and a reduction clutch (RED/C) is engaged during a preceding one-stage skip shift. An under drive clutch (UD/C) of the main shift part is engaged in a successive one-stage skip shift.

In that case, the final target shift stage can be corrected by previously detecting the change of the final target shift stage during the shift to the preceding shift stage. A sequential shift to the corrected final target shift is carried out after a completion of the shift to the preceding shift stage, thus improving the response of the shifting.

As apparent from the foregoing, there is an advantage in the shift control method for a six-speed automatic transmission of the present invention in that an automatic transmission embodying a multi-shift rate for a gearset with greater than or equal to 5 speeds initially detects the current shift situation and the driver's intention in relation to the multi-shift stages, contributing to a skip shift for greater than or equal to one-stage and an improved response during shifting.

There is another advantage according to the embodiments of multi-shift stages for a gearset with greater or equal to 5 speeds in that an actuation function is increased at low speeds and the fuel consumption rate is improved at high speeds.

What is claimed is:

1. A shift control method for a six-speed automatic transmission, comprising:
   performing a preceding shift control when disengagement components of a preceding shift stage and a final target shift stage are identical during skip shifting, then executing a one-stage skip shift control toward the final target shift stage when a set of required conditions is satisfied; and
   standing by for a predetermined time period without performing the preceding shift control when the disengagement components of the preceding shift stage and the final target shift stage are different during skip shifting, then performing a one-stage skip shift control toward the final target shift stage only if a set of required conditions are met;
   wherein the set of required conditions while disengagement components of the preceding and the final target shift stages are different during skip shifting comprises:
      standing by for a predetermined time from a point where a shift signal is outputted for a shift control to a preceding shift stage;
      a change of a current throttle openness and that of an estimated degree at a starting point of a shift control to the preceding shift stage is in excess of a preset value;
      the changed degree in throttle openness having been entered into the preceding shift stage is in excess of a preset value; and
      a vehicle speed under this condition is less than a speed limit of a wide open throttle for shifting to the final target shift stage.

2. The method as defined in claim 1, wherein the set of required conditions while disengagement components of the preceding and final target shift stages are identical during skip shifting comprise:
   delaying the shift control for the preceding shift stage for a predetermined time period from point where a shift signal of a shift control is outputted toward the preceding shift stage; and a detecting a shift signal for the final target shift stage.

* * * * *